United States Patent

Honkala et al.

(10) Patent No.: US 10,523,619 B2
(45) Date of Patent: Dec. 31, 2019

(54) STATELESS MESSAGE ROUTING (71) Applicant: ROVIO ENTERTAINMENT LTD., Espoo (FI)

(72) Inventors: Juhani Honkala, Helsinki (FI); Ari Talja, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 409 days.

(21) Appl. No.: 14/135,982

(22) Filed: Dec. 20, 2013

(65) Prior Publication Data

US 2015/0180806 A1  Jun. 25, 2015

(51) Int. Cl.
*G06F 15/16* (2006.01)
*H04L 12/58* (2006.01)

(52) U.S. Cl.
CPC .............. *H04L 51/28* (2013.01); *H04L 51/14* (2013.01)

(58) Field of Classification Search
None
See application file for complete search history.

(56) References Cited

U.S. PATENT DOCUMENTS

| 8,584,228 B1 * | 11/2013 | Brandwine | H04L 63/06 380/255 |
| 8,942,235 B1 * | 1/2015 | Vinapamula Venkata | H04L 63/02 370/254 |
| 2002/0188689 A1 * | 12/2002 | Michael | G06Q 10/107 709/206 |
| 2006/0168057 A1 * | 7/2006 | Warren | H04L 12/585 709/206 |
| 2008/0219445 A1 * | 9/2008 | Yato | H04L 63/1408 380/255 |
| 2008/0235399 A1 * | 9/2008 | Maekawa | H04L 12/4633 709/245 |
| 2008/0298267 A1 | 12/2008 | Knop et al. | |
| 2009/0129397 A1 | 5/2009 | Hare et al. | |
| 2009/0182873 A1 * | 7/2009 | Spalink | G06F 21/6254 709/224 |
| 2009/0210708 A1 * | 8/2009 | Chou | H04L 9/321 713/170 |
| 2009/0233618 A1 | 9/2009 | Bai et al. | |

(Continued)

FOREIGN PATENT DOCUMENTS

| RU | 2429587 C2 | 9/2011 |
| RU | 2483457 C2 | 5/2013 |
| WO | 2006/122366 A1 | 11/2006 |
| WO | WO 2010/044096 A2 | 4/2010 |

OTHER PUBLICATIONS

European Patent Office, Supplementary European Search Report corresponding to European Patent Appln. No. 14 87 1277, dated Jul. 5, 2017.

(Continued)

*Primary Examiner* — Yves Dalencourt
(74) *Attorney, Agent, or Firm* — Squire Patton Boggs (US) LLP (57) ABSTRACT

Defining a scalable cluster for high volume message delivery and delivering messages between actors is described. Actors are mapped to virtual nodes and virtual nodes to nodes using mathematical algorithms. The mathematical algorithms are further used to determine address information of actors for message delivery.

14 Claims, 6 Drawing Sheets

(56) References Cited

U.S. PATENT DOCUMENTS

| | | | |
|---|---|---|---|
| 2009/0247207 A1* | 10/2009 | Lor | H04L 29/12132 455/517 |
| 2010/0325219 A1* | 12/2010 | Vasters | G06F 9/546 709/206 |
| 2012/0002601 A1 | 1/2012 | Underwood et al. | |
| 2012/0011068 A1* | 1/2012 | Dearing | G06Q 10/083 705/50 |
| 2013/0339475 A1 | 12/2013 | Kataria et al. | |
| 2014/0007236 A1* | 1/2014 | Krueger | G06F 21/552 726/23 |
| 2014/0067762 A1* | 3/2014 | Carvalho | G06F 17/30958 707/636 |
| 2014/0201574 A1* | 7/2014 | Manchek | G06F 11/1407 714/38.13 |
| 2015/0256611 A1* | 9/2015 | Cohn | H04L 63/0272 709/202 |

OTHER PUBLICATIONS

Roy J. Bird, et al., "An Actor-Based Programming System", ACM, 2 Penn Plaza, Suite 701, New York, Jun. 23, 1982, XP040160044, pp. 67-78.

Legand L Burge III, et al., "JMAS: A Java-Based Mobile Actor System for Distributed Parallel Computation", USENIX, Apr. 1, 1999, XP061011912, pp. 1-16.

Steven Lauterburg, et al., "A Framework for State-Space Exploration of Java-based Actor Programs", 2010 International Workshop on Innovative Architecture for Future Generation High Performance, IEEE, 1730 Massachusetts Ave., NW Washington, DC 20036-1992 USA, Nov. 16, 2009, XP058117821, pp. 468-479.

Russian Office Action and Search Report dated Aug. 13, 2018 corresponding to Russian Patent Application No. 2016129483/08 (045823), and English translation thereof.

* cited by examiner

STATELESS MESSAGE ROUTING

TECHNICAL FIELD

Examples of the present invention relate to messaging in a scalable cluster. More specifically, the examples of the present invention relate to methods, apparatuses and a related computer program product for defining a scalable cluster and delivering messages within. Examples of the present invention may be applicable to actor based messaging

BACKGROUND

Many network services require high level of adaptation, self-organization, load balancing etc. For example in real time messaging, turn-based multiplayer games or other similar applications it is important that the messages are delivered promptly. As participants may join and leave the services as they wish, a robust and cost effective delivery of messages is a challenge. Messages need to be delivered to all participants in a service and each user can be active in multiple services. Delivering all messages to all parties is one method and sharing states (routing tables with address information) continuously is another method of delivering the messages. As the number of parties may be enormous, it is not efficient to deliver all messages to all parties. Sharing states may also bring considerable overhead to the messaging as the number of parties as well as their locations change.

SUMMARY

Therefore there is a need for an approach for defining address information for a party sending and/or receiving a message.

According to one example embodiment, a method comprises obtaining a message containing an actorID identifying, at least partly, an actor. The actorID is utilized in at least one mathematical algorithm to determine address information for the actor. The message is delivered to the actor using the address information.

According to another example embodiment the method further comprises the at least one mathematical algorithm being a deterministic algorithm.

According to another example embodiment the method further comprises the address information comprising address information of a node.

According to another example embodiment the method further comprises the node having a virtual node associated with it.

According to another example embodiment the method further comprises the at least one mathematical algorithm comprising a first mathematical algorithm that is usable to determine the address information of a virtual node and a second mathematical algorithm that is usable to determine the address information of a physical node associated with the virtual node.

According to another example embodiment the method further comprises the first algorithm being a hashing algorithms and the second algorithm being a consistent hashing algorithm.

According to another example embodiment the method further comprises delivering the message first to a segment in a buffer associated with the virtual node.

According to one example embodiment, a method of delivering a message to an actor, wherein the actor is identifiable, at least partly, by an actorID. The message contains, at least, information of the actorID. Wherein the delivering of the message comprises utilization of the actorID in at least one mathematical algorithm usable to determine address information associated with the actor.

According to another example embodiment, a non-transitory computer-readable memory that contains computer program readable instructions, where the execution of the computer program instructions which, when executed by at least one data processor causes:

obtaining a message containing an actorID identifying, at least partly, an actor;

utilizing the actorID in at least one mathematical algorithm to determine address information for the actor;

delivering the message to the actor using the address information.

According to another example embodiment, a computer-readable memory contains computer program instructions. The computer program instructions are executed by at least one data processor. Execution of the computer program product causes delivering a message to an actor, wherein the actor is identifiable, at least partly, by an actorID. The message contains, at least, information of the actorID, and wherein the delivering of the message results in: —utilization of the actorID in at least one mathematical algorithm usable to determine address information associated with the actor.

According to another example embodiment, an apparatus comprises at least one processor and at least one memory including computer program code configured to, with the at least one processor, cause the apparatus to perform at least the following:

delivering a message to an actor, wherein the actor is identifiable, at least partly, by an actorID. Where the message contains, at least, information of the actorID. The delivering of the message comprises utilization of the actorID in at least one mathematical algorithm usable to determine address information associated with the actor.

According to another example embodiment an example computer program product includes one or more sequences of one or more instructions which, when executed by one or more processors, cause an apparatus to deliver a message to an actor, wherein the actor is identifiable, at least partly, by an actorID. The message contains, at least, information of the actorID. Wherein the delivering of the message comprises utilization of the actorID in at least one mathematical algorithm usable to determine address information associated with the actor.

According to another example embodiment, a non-transitory computer-readable medium encoded with instructions that, when executed in hardware, perform a process, the process comprising:

obtaining a message containing an actorID identifying, at least partly, an actor;

utilizing the actorID in at least one mathematical algorithm to determine address information for the actor;

delivering the message to the actor using the address information.

According to another example embodiment, an apparatus comprises:

means for obtaining a message containing an actorID identifying, at least partly, an actor;

means for utilizing the actorID in at least one mathematical algorithm to determine address information for the actor;

means for delivering the message to the actor using the address information.

According to another example embodiment, a computer implemented method comprises obtaining a message containing an actorID identifying, at least partly, an actor. The actorID is utilized in at least one mathematical algorithm to determine address information for the actor. The message is delivered to the actor using the address information.

BRIEF DESCRIPTION OF THE FIGURES

The embodiments of the invention are illustrated by way of example—not by way of limitation, in the figures of the accompanying drawings.

DESCRIPTION OF SOME EMBODIMENTS

The following embodiments are exemplary only. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of the information system comprise elements that are suitable for the example embodiments and may not be specifically described herein.

Examples of a method, a computer readable medium, an apparatus and a computer program product for providing architecture for delivering messages are disclosed.

As used herein, the term "actor" refers to a computational entity capable of having a state and as response to an event, for example a message, is capable of altering the state. Furthermore the actor may be capable of, among other things, making local decisions, create more actors, send messages, and determine how to respond to the messages received. An actor may represent for example:
  a user, referred as user actor hereafter;
  a chat room, referred as chat room actor hereafter;
  a game state, referred as game state actor hereafter;
  a multiplayer game state, referred as multiplayer game state actor hereafter.

The list of example actors above is not exhaustive. Various types of actors can be introduced depending on need. The actors may be independent and they may also be equal and the actors are capable of communicating with other actors by at least sending or receiving messages.

As used herein, the term "actorID" refers to data that is used to authenticate an actor. The data can be any data that can be used to individually authenticate an actor. Examples of such data are for example strings of numbers or letters or symbols or a combination of all previously mentioned.

As used herein, the term "message" refers to an object of communication containing a discrete set of data sent from one actor to another. The message may contain, but is not limited to, for example, an actorID identifying the actor sending the message and another actorID identifying the actor receiving the message, message content and type of the message. The type of the message may be embedded into the message content. The message may be human-readable or non-human-readable and it may be sent between the actors (persons, devices, applications and any combinations thereof). It can be for example a chat message from a user to another user, a game event from an actor to another, information to be delivered from one application to another application etc.

As used herein, the term "vnode" (virtual node) refers to an abstract group of actors. An actor is associated with a vnode based on its actorID. The actors may be associated with vnodes using consistent hashing algorithm.

As used herein, the term "node" refers to a physical computational entity capable of managing virtual nodes associated with it. The virtual nodes are associated with the nodes deterministically using a mathematical model and the nodes use same model for defining the vnode to node mapping. Each node is responsible for a group of vnodes. At least one of the nodes may be implemented using cloud computing services, which may appear to be provided by real server hardware but are in fact served up by virtual hardware and simulated by software running on one or more real machines.

As used herein, the term "cluster" refers to a group of nodes which are connected to work together and can be in some cases seen as a single system. The nodes may be connected by a network comprising any combination of hardware and software components enabling a process in one node to send or receive information to or from another process in another node. The network may be, for example, a local area network, a home network, a storage area network, a campus network, a backbone network, a cellular network, a metropolitan area network, a wide area network, an enterprise private network, a virtual private network, a private or public cloud or an internetwork, or a combination of any of these.

As used herein, the term "consistent hashing algorithm" refers to an optimized kind of hashing where assignments are done using an algorithm decreasing need for remapping when changes happen. If cluster size changes a number of vnodes may be associated with other nodes. Vnodes may be associated to new nodes or re-associated to existing nodes. Cluster size may change when the number of actors (like user actors) change. Consistent hashing minimizes number of changes in vnode assignments. The algorithm requires knowledge of number of the nodes in the cluster and some identification information for the nodes. As a part of the algorithm the nodes can be ordered for example by the identification information, which may comprise for example an address or a unique running number assigned to each of the nodes. Each node in a cluster is responsible for a group of vnodes determined by a consistent hashing algorithm.

As used herein, the term "client" refers to an external entity connecting to the cluster. Client may be any kind of device with a user interface like a portable gaming device, a mobile phone, a computer, a pad-device, a media device in a car, a household device like a fridge, a TV etc.

As used herein, the term "actor messaging" refers to messaging between the actors. Several suitable scalable messaging solutions exist like Akka, Riak, Kafka etc. which can be used as a scalable back-end solution for chat systems and game servers among others. Actor messaging may include buffering of messages.

As used herein, the term "external messaging" refers to messaging between the actors and clients. Several suitable messaging solutions exist like WebSocket, https etc. Clients are capable of utilizing the external messaging when sending messages to actors or receiving messages from actors.

As used herein, the term "buffer" refers to an entity for storing data in specified queue. The entity may be region on memory and the data can be organized according to many suitable message queuing protocols, including RabbitMQ, Kafka and other suitable buffering systems.

As used herein, the term "address information" refers to data that is used to define information for delivering a message to correct receiver. The information includes information to which vnode an actor is assigned to and to which node a vnode is assigned to.

Figure 1:
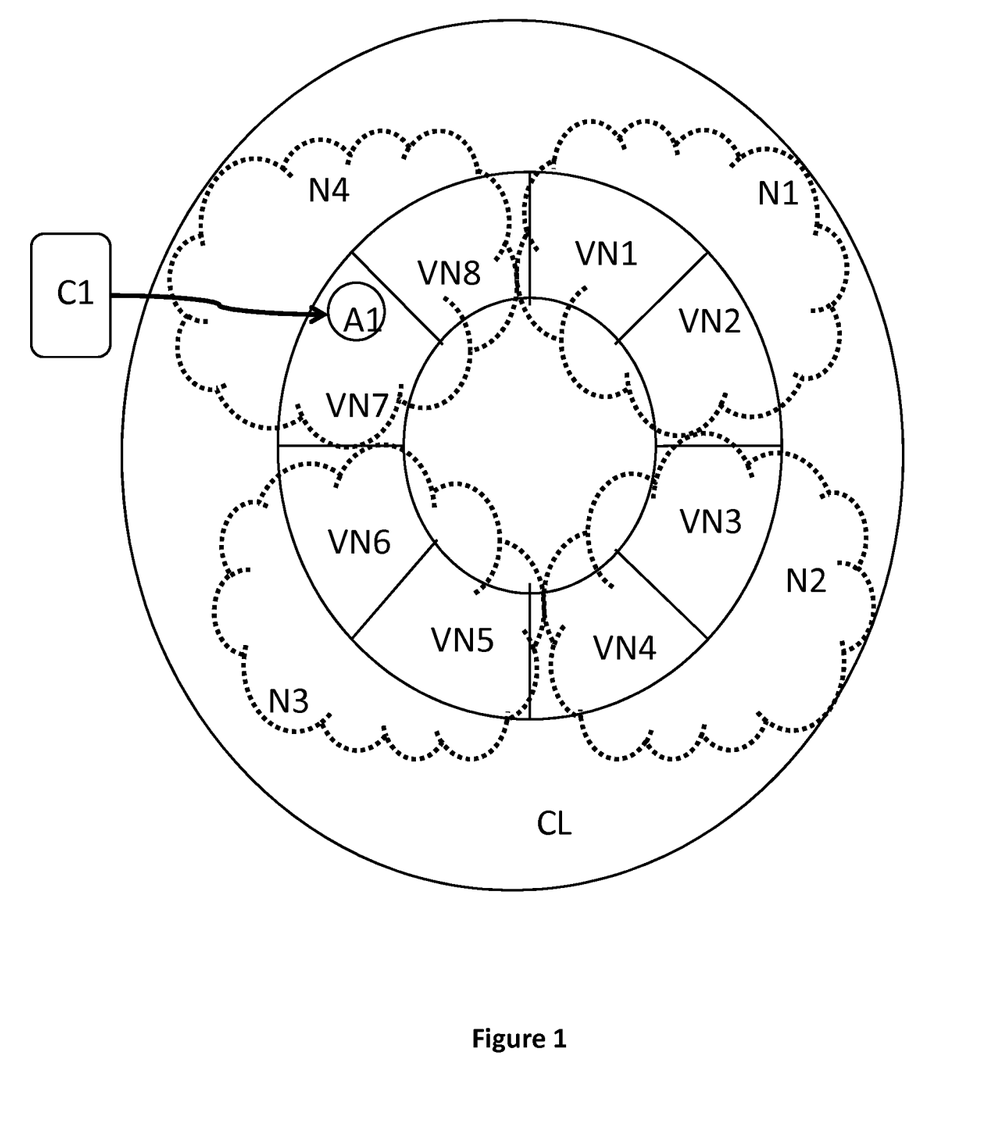
FIG. 1 illustrates an example cluster.

FIG. 1 is a diagram of a cluster CL capable of providing architecture for delivering messages according to one example embodiment. The diagram is simplified including only one client C1, one actor A1, four nodes N1-N4 and eight vnodes VN1-VN8. Number of nodes N, virtual nodes VN associated with the nodes and actors associated with virtual nodes may vary depending on need.

The client C1 needs only one connection to the cluster CL. Messaging to and from the client C1 is arranged using external messaging. In the cluster CL virtual nodes VN1-VN8 are associated with the nodes N1-N4 as follows:

VN1 and VN2 to N1
VN3 and VN4 to N2
VN5 and VN6 to N3
VN7 and VN8 to N4

For each client connection there is a corresponding user actor in the cluster. In FIG. 1 the client C1 has a corresponding actor A1 (user actor) in vnode VN7 which belongs to node N4.

Figure 2:
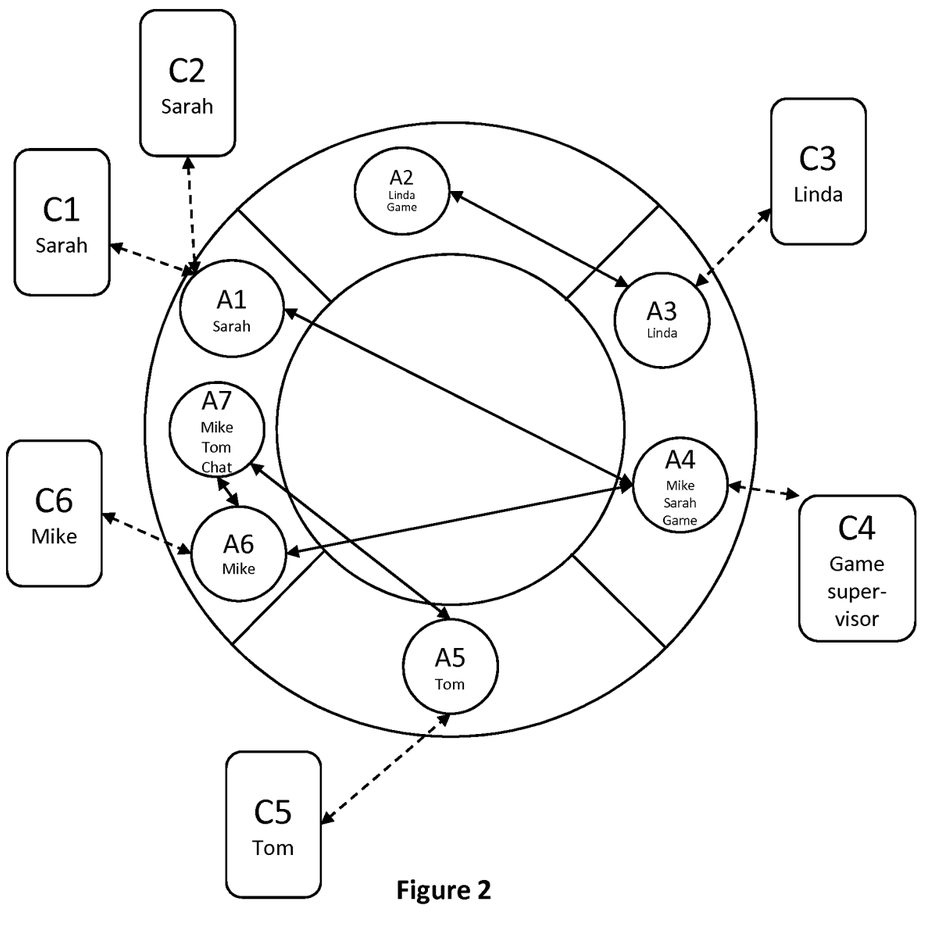
FIG. 2 further illustrates the example cluster.

FIG. 2 further illustrates messaging between clients C and actors A. Dotted lines between clients C1-C6 and actors A1-A7 represent external messaging and the continuous lines between actors A represent actor messaging. Like in FIG. 1 every client C is connected to the cluster CL (not depicted in FIG. 2) with one connection to the corresponding actor A.

In FIG. 2 the clients C and actors A are identified with user names in order to simplify the illustration. It is to be noted that one person may have more than one clients C. For example person Sarah has two clients, C1 "Sarah" and C2 "Sarah" connected to the same cluster and associated with the same actor A1 "Sarah". The more than one clients of a same person may exist on a same or separate user devices with same or different applications connected to the cluster CL. Furthermore, in some example embodiments, the client C may be an application server or similar running a large number of sessions which may have multiple separate actors active on the cluster CL.

Let us consider an example where two persons, Mike and Sarah are playing a multiplayer game. They are using for example mobile phones with wireless connection to access the game. They both are connected to the same cluster and capable of using services available there. Either of the persons may have initiated a game session and invited the other one to join.

In the example embodiment of FIG. 2 client C4 Game-Supervisor, is associated with game actor A4 "Mike-Sarah-Game" with which user actors A1 "Sarah" and A6 "Mike" are exchanging messages using actor messaging. The messages may be game events relating to current status or action in a game. In case the messages originate from or are addressed to clients C1 "Sarah", C2 "Sarah", C6 "Mike" or C4 "Game-Supervisor" external messaging is used. In general: in the gaming example user actors take care of handling incoming and outgoing messages for the clients and forwards messages between relevant gaming actors.

Let us consider an example where two persons, Tom and Mike are chatting using a messaging application. They are using for example laptops with wireless connection to access the messaging application. They both are connected to the same cluster and capable of using services available there. Either of the persons may have initiated a chatting session and invited the other one to join.

In another example embodiment of FIG. 2 is illustrated how clients C5 "Tom" and C6 "Mike" are connected to the user actors "Tom" A5 and "Mike" A6 which are both connected to the messaging thread actor A7 "Tom-Mike-Chat", which is a chatting actor for exchanging messages between users Mike and Tom. As an example Mike types a message using a chat application in his user device to Mike. The message is first delivered to actor A6 "Mike" using external messaging and then, using actor messaging, from actor A6 "Mike" to actor A7 "Mike-Tom-Chat" and forwarded to actor A5 "Tom" and finally to client C5 "Tom" using external messaging. Now Tom is able to read the message using his chat application on his user device. In general: in the chat example user actors take care of handling incoming and outgoing messages for the clients and forwards messages between relevant messaging threads.

FIG. 2 further illustrates an example embodiment where user Linda—client C3 "Linda" is connected to user actor "Linda" A3 which is connected to game actor A2 "Linda-Game". In this example user Linda, client C3 "Linda" or user actor A3 "Linda" is not connected to any other user actor—only to the game actor A2 "Linda game".

Figure 3:
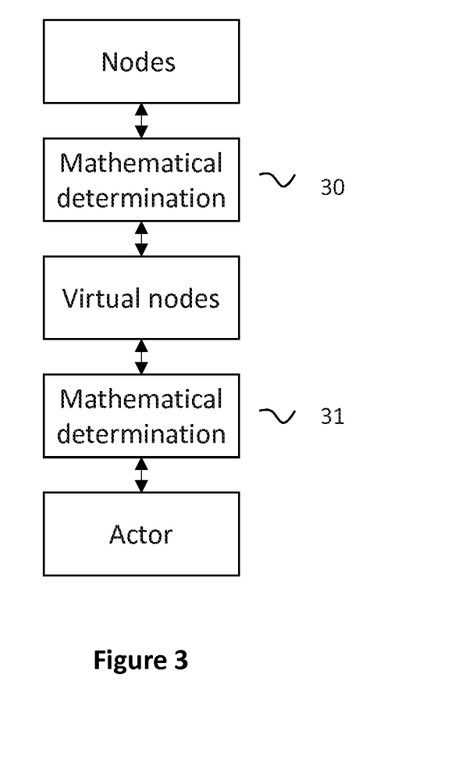
FIG. 3 further illustrates a flow chart defining how an example cluster is defined.

FIG. 3 is an flowchart describing an example method how actors A and virtual nodes VN are associated with nodes N. Number of nodes may vary from one to n. Virtual nodes VN are associated with the nodes N using mathematical determination (30). Actors A are associated with the virtual nodes using mathematical determination (31). The mathematical determination in both steps (30 and 31) may use same methods or be different. The mathematical determination may comprise consistent hashing or other suitable methods for mapping. It is to be noted that in some embodiments the actor A may be associated directly to a node N and virtual node VN is not needed. The arrows in FIG. 3 illustrate that at least some embodiments of the invention may be implemented when defining a cluster CL and at least some when delivering messages in an existing cluster CL.

The simplified examples in FIGS. 1 and 2 depict situations where only few clients C are present. When the number of clients C and thus actors A and nodes N increase the situation gets more complex. Especially as the clients C may join and leave the cluster CL as they wish and also start/stop using applications (generating/end actors A) handling message delivery promptly and efficiently is important.

When designing a cluster according to at least some embodiments the number of estimated users can be estimated and then calculated how many nodes are needed to do all the processing the cluster need to be able to handle. When building up a cluster the number of nodes is defined and each node has individual identification information, which can be for example IP-address, a running numbering assigned to the nodes, name or other suitable means.

The nodes are associated with a number of virtual nodes. Each virtual node has individual address information defining how the virtual nodes are organized. The term address information with relation to vnodes may be an abstract definition how the vnode information is organized in a node or in a cluster.

If the amount of the nodes needs to be changed, some of the vnodes are associated with new nodes using consistent hashing algorithm to minimize the number or re-mappings. The nodes get information of the current amount of nodes for example by monitoring the cluster size (e.g. monitoring IP-address space) or there may be a controlling system informing the nodes about changes in the cluster size.

When a client C wishes to connect for example to a game actor in a cluster CL, a message is generated by an application running in a user device of client C and sent to any node in the cluster using external messaging. The message is redirected to the correct vnode VN on correct node N directly by determining how the game actor is assigned to a vnode and the vnode to a node. As the same method is used for all clients and other entities when creating an actor A, there is no need to update and share explicit routing tables including address information for all actors A. The routing tables are look-up tables, which are used to store and share address information for actors in a cluster. One benefit of at least one embodiment is that there is no need to synchronize the routing tables regarding how each vnode and actor are associated in the cluster. As the mapping is consistent, the correct vnode and correct node are always determined purely using the mathematical algorithms, which take away the need for a shared mapping table. The mappings can be calculated on the go or they can be determined in advance. A node is aware of which vnodes belong to which nodes but the nodes do have not interact otherwise. Another way of managing messaging is to send all messages always to all actors, which would yield excessive load on actors and messaging pathways.

Figure 4:
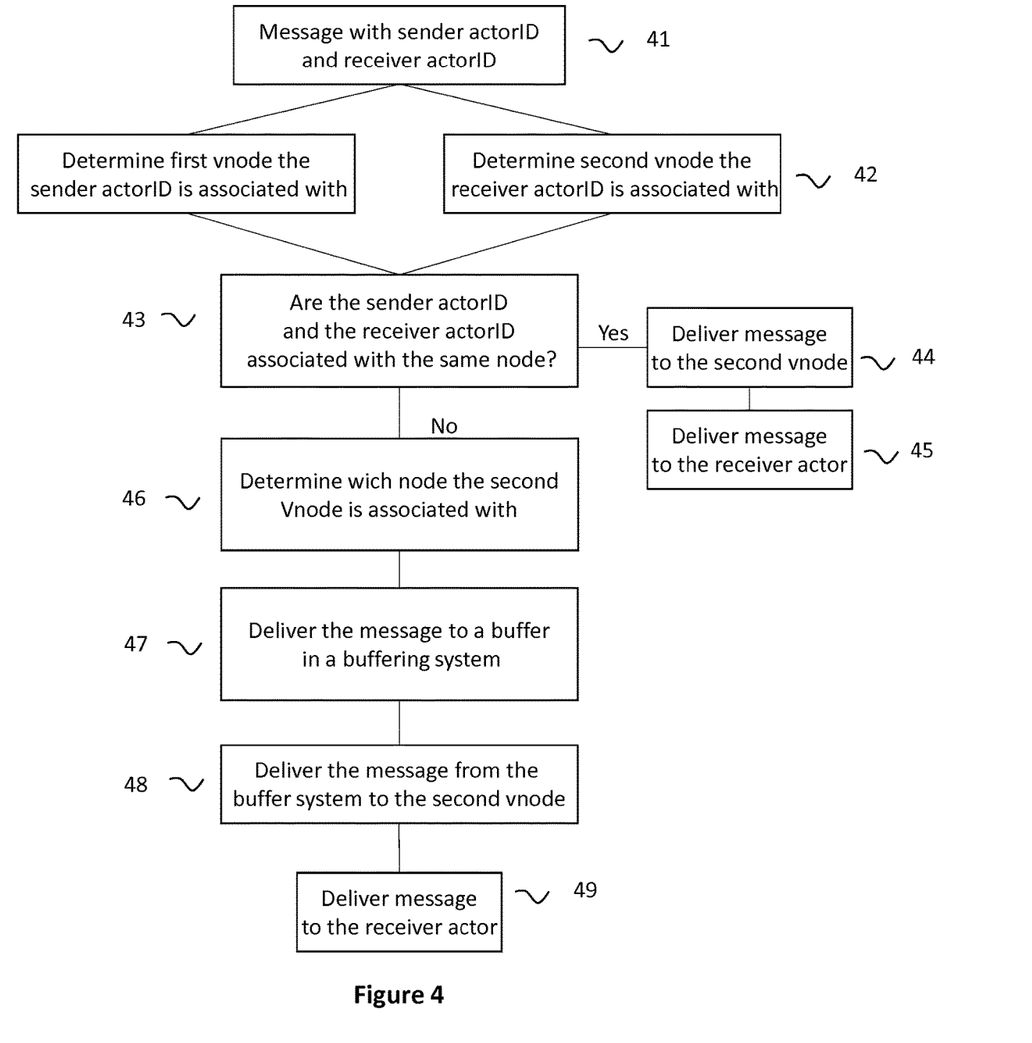
FIG. 4 illustrates a flow chart defining how an example message delivery.

FIG. 4 illustrates an example embodiment where delivery of a message is shown as a flow chart. In step 41 a message is received or obtained, the message containing at least sender actorID and receiver actorID identifying sender actor and receiver actor of the message. In step 42 a mathematical algorithm is used to determine which vnode (first vnode) the sender actorID is associated with and which vnode (second vnode) the receiver actorID is associated with. It is to be noted that the determination of actorIDs in step 42 can be done in any order.

In step 43 it is checked if the sender actorID and the receiver actorID are associated with the same node.

If yes—the message is delivered to the second vnode—step 44 and further to the receiver actor—step 45.

If no—it is determined, using a mathematical algorithm, which node the second vnode is associated with—step 46.

In the latter case the message is delivered to a buffer in a buffer system—step 47. The message is then delivered or obtained from the buffer to the second vnode—step 48 and finally to the receiver actor—step 49.

Figure 5:
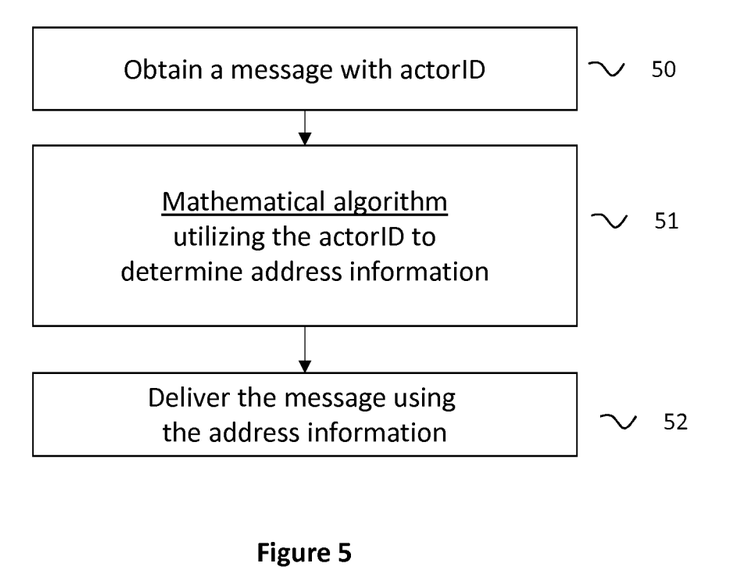
FIG. 5 illustrates a simplified message delivery.

FIG. 5 illustrates an example embodiment where a message containing an actorID is obtained, 50. The actorID identifies, at least partly, an actor. Utilizing the actorID in at least one mathematical algorithm, 51 to determine address information for the actor and delivering, 52 the message to the actor using the address information.

Figure 6:
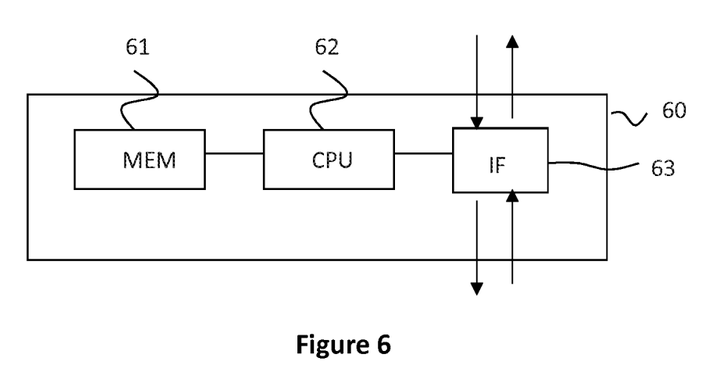
FIG. 6 illustrates an example node device.

FIG. 6 illustrates an example node device. As described earlier the node refers to a physical or virtual computational entity capable of managing virtual nodes associated with it. The computational entity may be a device capable of handling data. It may be a server device, computer or like running a chat application or a game application etc. The node device, 60 comprises a memory (MEM), 61 for storing information relating e.g. to the virtual nodes associated with it, instructions how to handle messages etc. The memory 61 may comprise volatile or non-volatile memory, for example EEPROM, ROM, PROM, RAM, DRAM, SRAM, firmware, programmable logic, etc.

The node device, 60 further comprises one or more processor units (CPU), 62 for processing the instructions and running computer programs and an interface unit (IF), 63 for sending and receiving messages.

Figure 7:
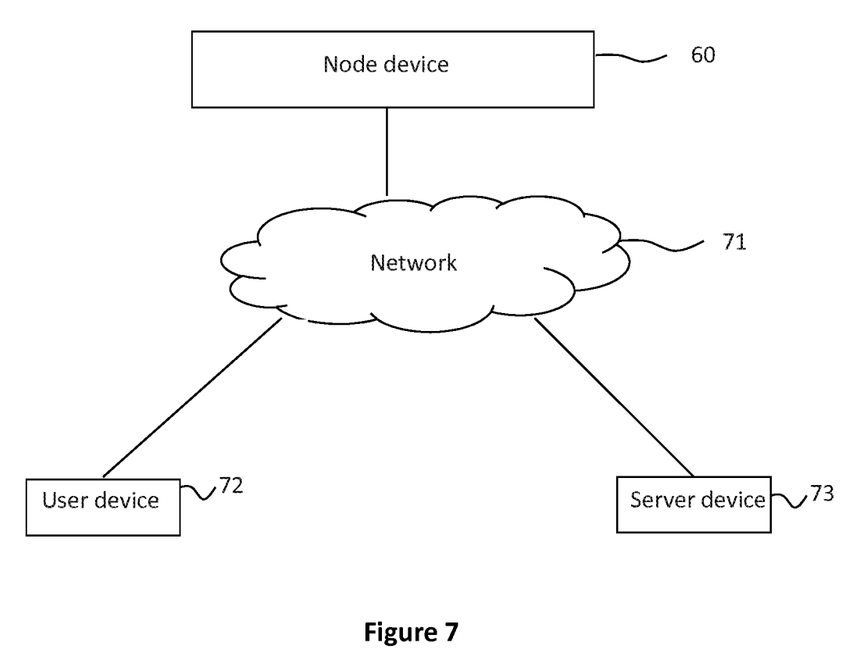
FIG. 7 illustrates an example network.

FIG. 7 illustrates an example network system in which at least one embodiment of the present invention may be implemented. The shown network system comprises a node device 60, a user device 72, a server device 73 and network 71. The network 71 represents here any combination of hardware and software components that enables a process in one communication endpoint to send or receive information to or from another process in another, remote communication endpoint. The network 61 may be, for example, a personal area network, a local area network, a home network, a storage area network, a campus network, a backbone network, a metropolitan area network, a wide area network, an enterprise private network, a virtual private network, or an internetwork, or a combination of any of these. The example network system of FIG. 7 is a simplified illustration depicting only one node device 60, user device 72 and server device 73. As defined earlier the amounts of the devices may vary. The devices are shown as separate units but in some embodiments any of the node device 60, user device 72 or server device 73 may be implemented in a same device. For example the server device 73 may be implemented on the node device 60 acting as a messaging server, a game server, a chat room server etc.

While various aspects of the invention have illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method comprising:

obtaining by a computer entity a message comprising at least one actorID identifying, at least partly, a sending actor and a receiving actor, wherein the at least one actorID comprised in the message includes data used to authenticate the sending actor and the receiving actor;

determining using a deterministic algorithm by the computer entity address information of a first virtual node for the sending actor and a second virtual node for the receiving actor from the at least one actorID comprised in the message;

determining by the computer entity based on the address information of the first virtual node and the address information of the second virtual node whether the sending actor and the receiving actor are associated with a same first node;

if the receiving actor is associated with the same first node as the sending actor, delivering by the computer entity the message to a user device of the receiving actor via the second virtual node using the address information determined from the at least one actorID comprised in the message; and if the receiving actor is not associated with the same first
   node as the sending actor, determining, using another
   deterministic algorithm by the computer entity, address
   information of a different second node associated with
   the second virtual node, and redirecting the message to
   the second virtual node associated with the different
   second node for delivering the message to the user
   device of the receiving actor via the second virtual node
   using the address information determined from the at
   least one actorID comprised in the message.

2. The method according to claim 1, wherein the address information is determined from the actorID deterministically.

3. The method according to claim 1, wherein the first node has a virtual node associated with the first node.

4. The method according to claim 1, wherein a first method is usable to determine the address information of the virtual node and a second method is usable to determine the address information of a physical node associated with the virtual node.

5. The method according to claim 4, wherein the first method is a hashing and the second method is a consistent hashing.

6. The method according to claim 1, further comprising delivering by the computer entity the message first to a segment in a buffer associated with the second virtual node.

7. A non-transitory computer-readable memory that contains computer readable instructions which, when executed by at least one data processor cause:
   obtaining by a computer entity a message comprising at
      least one actorID identifying, at least partly, a sending
      actor and a receiving actor, wherein the at least one
      actorID comprised in the message includes data used to
      authenticate the sending actor and the receiving actor;
   determining using a deterministic algorithm by the computer entity address information of a first virtual node
      for the sending actor and a second virtual node for the
      receiving actor from the at least one actorID comprised
      in the message;
   determining by the computer entity based on the address
      information of the first virtual node and the address
      information of the second virtual node whether the
      sending actor and the receiving actor are associated
      with a same first node;
   if the receiving actor is associated with the same first node
      as the sending actor, delivering by the computer entity
      the message to a user device of the receiving actor via
      the second virtual node using the address information
      determined from the at least one actorID comprised in
      the message; and
   if the receiving actor is not associated with the same first
      node as the sending actor, determining, using another
      deterministic algorithm by the computer entity, address
      information of a different second node associated with
      the second virtual node, and redirecting the message to
      the second virtual node associated with the different
      second node for delivering the message to the user
      device of the receiving actor via the second virtual node
      using the address information determined from the at
      least one actorID comprised in the message.

8. The non-transitory computer-readable memory according to claim 7, wherein the address information is determined from the actorID deterministically.

9. The non-transitory computer-readable memory according to claim 7, wherein the first node has a virtual node associated with the first node.

10. The non-transitory computer-readable memory according to claim 7, wherein a first method is usable to determine the address information of the virtual node and a second method is usable to determine the address information of a physical node associated with the virtual node.

11. The non-transitory computer-readable memory according to claim 10, wherein the first method is a hashing and the second method is a consistent hashing.

12. The non-transitory computer-readable memory according to claim 7, further comprising delivering by the computer entity the message first to a segment in a buffer associated with the second virtual node.

13. A computer program product including one or more sequences of one or more instructions which, when executed by one or more processors, cause an apparatus to at least perform the steps of:
   obtaining by a computer entity a message comprising at
      least one actorID identifying, at least partly, a sending
      actor and a receiving actor, wherein the at least one
      actorID comprised in the message includes data used to
      authenticate the sending actor and the receiving actor;
   determining, using a deterministic algorithm by the computer entity address information of a first virtual node
      for the sending actor and a second virtual node for the
      receiving actor from the at least one actorID comprised
      in the message;
   determining by the computer entity based on the address
      information of the first virtual node and the address
      information of the second virtual node whether the
      sending actor and the receiving actor are associated
      with a same first node;
   if the receiving actor is associated with the same first node
      as the sending actor, delivering by the computer entity
      the message to a user device of the receiving actor via
      the second virtual node using the address information
      determined from the at least one actorID comprised in
      the message; and
   if the receiving actor is not associated with the same first
      node as the sending actor, determining, using another
      deterministic algorithm by the computer entity, address
      information of a different second node associated with
      the second virtual node, and redirecting the message to
      the second virtual node associated with the different
      second node for delivering the message to the user
      device of the receiving actor via the second virtual node
      using the address information determined from the at
      least one actorID comprised in the message.

14. An apparatus comprising at least one processor, an interface unit and at least one memory including computer program code configured to, with the at least one processor, cause the apparatus to perform at least the following,
   obtain by a computer entity a message comprising at least
      one actorID identifying, at least partly, a sending actor
      and a receiving actor, wherein the at least one actorID
      comprised in the message includes data used to authenticate the sending actor and the receiving actor;
   determine, using a deterministic algorithm by the computer entity address information of a first virtual node
      for the sending actor and a second virtual node for the
      receiving actor from the at least one actorID comprised
      in the message;
   determine by the computer entity based on the address
      information of the first virtual node and the address
      information of the second virtual node whether the
      sending actor and the receiving actor are associated
      with a same first node;

if the receiving actor is associated with the same first node as the sending actor, deliver by the computer entity the message to a user device of the receiving actor via the second virtual node using the address information determined from the at least one actorID comprised in the message; and if the receiving actor is not associated with the same first node as the sending actor, determine, using another deterministic algorithm by the computer entity, address information of a different second node associated with the second virtual node, and redirect the message to a virtual node associated with the different second node for delivering the message to a user device of the receiving actor via the second virtual node using the address information determined from the at least one actorID comprised in the message.

* * * * *